United States Patent
Ishiguro et al.

[19]

[11] Patent Number: 5,903,593
[45] Date of Patent: May 11, 1999

[54] SPREAD SPECTRUM SIGNAL RECEIVER

[75] Inventors: Kazuhisa Ishiguro, Gunma; Hiroyasu Yoshida, Gifu; Yoshiaki Takahashi, Gunma, all of Japan

[73] Assignee: Sanyo Electric Co., Ltd., Osaka, Japan

[21] Appl. No.: 08/807,837

[22] Filed: Feb. 25, 1997

[30] Foreign Application Priority Data

Feb. 29, 1996 [JP] Japan .................................. 8-043689

[51] Int. Cl.⁶ ............................................. H04B 15/00
[52] U.S. Cl. ...................... 375/200; 375/200; 375/201; 375/362
[58] Field of Search ................................. 375/200, 206, 375/216, 302, 208, 367, 201, 376, 362; 370/312, 349

[56] References Cited

U.S. PATENT DOCUMENTS

| | | | |
|---|---|---|---|
| 5,140,610 | 8/1992 | Holliday et al. ..................... | 375/201 |
| 5,241,562 | 8/1993 | Partyka et al. ...................... | 375/206 |
| 5,301,206 | 4/1994 | Ishigaki et al. ..................... | 375/200 |
| 5,420,850 | 5/1995 | Umeda et al. ...................... | 370/342 |

*Primary Examiner*—Stephen Chin
*Assistant Examiner*—Shuwang Liu
*Attorney, Agent, or Firm*—Loeb & Loeb LLP

[57] ABSTRACT

In a spread spectrum signal receiver, a frequency divider circuit divides the frequency of the output signal of a VCO having a phase synchronized with that of the output signal of first multiplier. A first spreading code generating circuit generates a spreading code in response to the output signal of the frequency divider circuit. A second spreading code generating circuit generates first through third spreading codes in response to the spreading code. A selection circuit selects one of the first through third spreading codes. A second multiplier despreads the spectrum using the spreading code output from the selection circuit. A correlation detector circuit detects correlation from the output signal of the second multiplier and a control signal generates a delay or advance control signal in response to the detected correlation. The frequency dividing ratio of the frequency divider circuit is switched according to the delay or advance control signal. The timing of generating a spreading code can be regulated by changing the frequency dividing ratio, and then the timing of the spreading code of the transmitter side and that of the receiver side coincide.

9 Claims, 4 Drawing Sheets

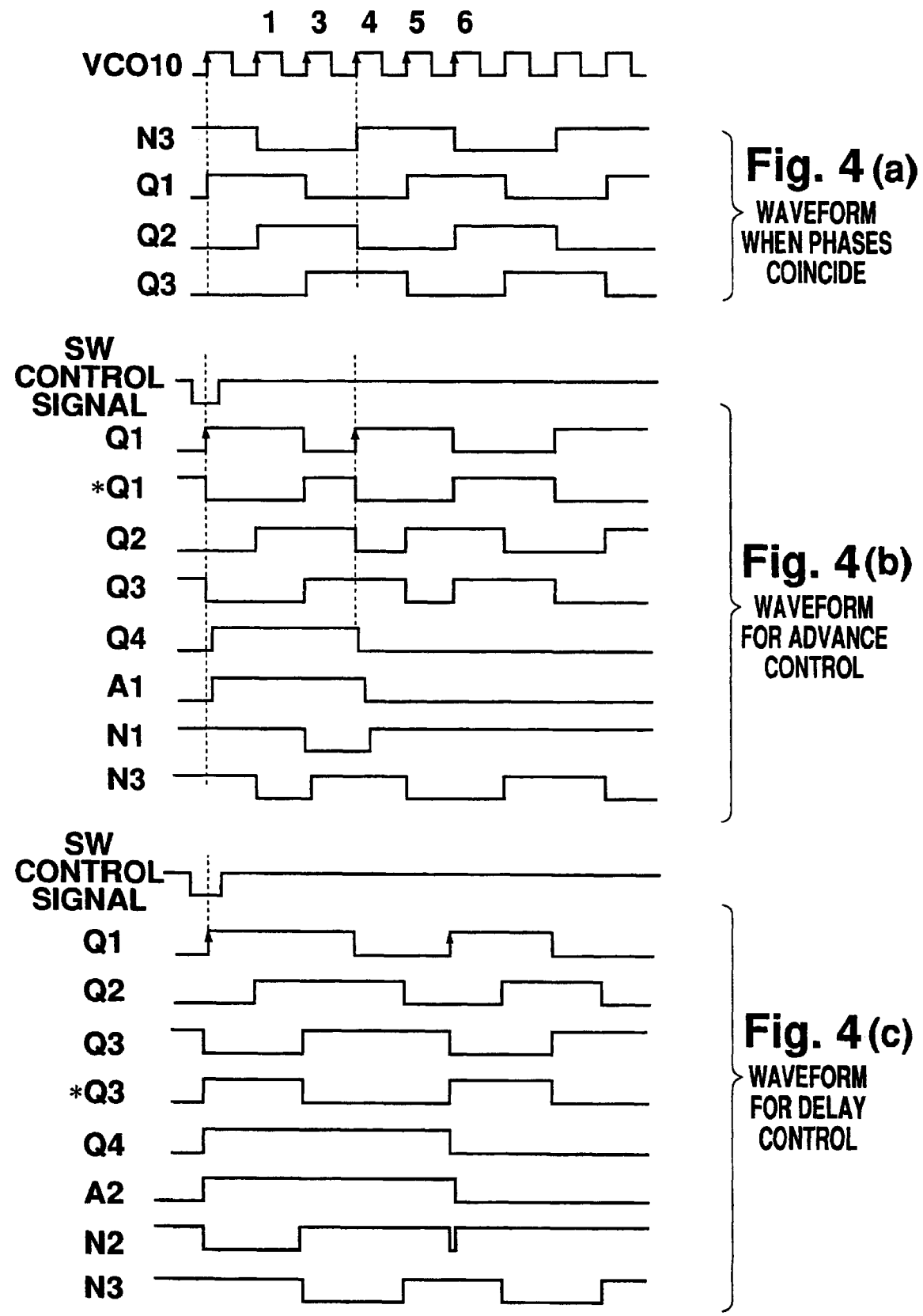

SPREAD SPECTRUM SIGNAL RECEIVER

BACKGROUND OF THE INVENTION

1. Field of the Invention

This invention relates to a direct spread type spread spectrum receiver and, more particularly, it relates to a spread spectrum receiver adapted to prevent the occurrence of phase errors in the transmitter side PN code and the receiver side PN code when a phase-locked loop is used for establishing and holding synchronism.

2. Description of the Prior Art

The spread spectrum communication system has been well known as a radio communications system. With the spread spectrum system, the transmitter side modulates the carrier wave by means of an information signal, such as an audio signal or a data signal, and the modulated information signal is multiplied by a spreading code such as an Maximum length sequence spreading code (Maximum length code) for spectral spread. The spectrally spread signal is then transmitted by way of an antenna. On the receiver side, on the other hand, the received spread spectrum signal is multiplied by the same spreading code for despreading and demodulated to reproduce the original information signal.

With the spread spectrum communication system, the spreading code prepared by the receiver and the spreading code contained in the signal being received have to be synchronized and the received spread spectrum signal has to be multiplied by the prepared spreading code. A spread spectrum receiver as shown in FIG. 1 has been proposed and used for maintaining the synchronism of the spreading code prepared by the receiver side and the spreading code contained in the signal being received. Referring to FIG. 1, the received spread spectrum signal is subjected to frequency conversion to a lower frequency in a frequency conversion circuit (1) to facilitate the processing operations in the downstream circuits and subsequently multiplied in a multiplier (2) by the spreading code generated using a spreading code generating circuit (3). The output signal of the multiplier (2) is then compared with the output signal of a VCXO (voltage controlled crystal oscillator) (5) for phase comparison in a phase comparator circuit (4). The output signal of the phase comparator circuit (4) that reflects the outcome of the phase comparison is smoothed by an LPF (6) and thereafter applied to the VCXO (5) as a control signal so that the oscillation frequency of the VCXO (5) is altered according to the control signal. The output signal of the VCXO (5) is applied to the phase comparator circuit (4) and, at the same time, frequency-divided by a frequency divider (7) before being applied to the spreading code generating circuit (3). Note that the multiplier (2), the phase comparator circuit (4), the VCXO (5) and the LPF (6) form a PLL (phase-locked loop), which operates to nullify the phase difference between the two input signals of the phase comparator circuit (4). Thus, the timing of generating a spreading code of the spreading code generating circuit (3) changes according to the change in the oscillation frequency of the VCXO (5) and the PLL operates to synchronize the phases of the two input signals from the phase comparator circuit (4) so that consequently the phase of the output signal of the multiplier (2) and that of the output signal of the VCXO (5) become synchronized.

After the PLL is locked, a spreading code that is synchronized with the spread spectrum signal is generated by the spreading code generating circuit (3) and the spread spectrum signal is multiplied by the spreading code in the multiplier (2) for despreading. The output signal of the multiplier (2) generated by despreading is applied to a demodulator circuit (9) via the BPF (8) to reproduce the information signal by demodulation.

Referring to FIG. 1, the PLL operates to synchronize the phases of the two input signals of the phase comparator circuit in order to nullify the phase difference between the output signal of the multiplier (2) and that of the VCXO (5). However, in reality, the phase of the spreading code prepared by the receiver side and that of the spreading code contained in the received spread spectrum signal do not accurately coincide with each other and precise despreading cannot be realized due to the delay in the operation of some of the elements constituting the circuit of FIG. 1.

SUMMARY OF THE INVENTION

According to the invention, the above problem is resolved by providing a spread spectrum receiver for receiving a spread spectrum signal comprising a despreading circuit for despreading the spread spectrum signal and a phase synchronization circuit for generating an output signal with a phase synchronized with that of the output signal of the despreading circuit, characterized in that it further comprises a frequency divider circuit having a plurality of frequency dividing ratios for dividing the frequency of the output signal of said phase synchronization circuit by using one of the frequency dividing ratios, a spreading code generating circuit for generating a plurality of spreading codes according to the output signal of the spreading code generating circuit, a correlation detector circuit for detecting the correlation of the spread spectrum code and the plurality of spreading codes and a control circuit for generating a control signal for selecting one of the plurality of frequency dividing ratios according to the output signal of the correlation detector circuit and a select signal for switching the output signal of the spreading code generating circuit.

Additionally, a spread spectrum signal receiver according to the invention is further characterized in that the control circuit outputs either an advance control signal or a delay control signal according to the output signal of the correlation detector circuit and the frequency divider circuit switches the frequency dividing ratio to lower upon receiving the advance control signal and to higher upon receiving the delay control signal.

Still further, a spread spectrum receiver according to the invention is further characterized in that the frequency divider circuit has frequency dividing ratios of N−1, N and N+1 and the frequency dividing ratios are switched according to the control signal of the control circuit.

Additionally, a spread spectrum receiver according to the invention is further characterized in that said control circuit outputs either the advance control signal or the delay control signal according to the output signal of said correlation detector circuit and said frequency divider circuit switches said frequency dividing ratio to N−1 upon receiving said advance control signal and to N+1 upon receiving said delay control signal.

Still further, the control circuit generates the advance control signal when the phase of the spreading code of the spreading code generating circuit is delayed from that of the spread spectrum signal, and the delay control signal when the phase of the spreading code of the spreading code generating circuit is advanced from that of the spread spectrum signal.

Thus, according to the invention, the correlation output representing the correlation of the spreading codes and the spread spectrum signal is detected to synchronize an appropriate one of the spreading codes and the spread spectrum signal according to the output of the detection so that the spreading code of the transmitter side and that of the receiver side are accurately synchronized for an accurate despread spectrum. In particular, since the frequency dividing ratios of the frequency divider circuit are switched according to the detected correlation, the operation of switching the frequency dividing ratios is carried out reliably, disregarding the timing in terms of the phase of the input signal, to avoid errors and reliably regulate the phase of the output signal.

Additionally, according to the invention, the frequency divider circuit switches the frequency dividing ratio to N−1 upon receiving an advance control signal and returns the frequency dividing ratio to N after a predetermined period of time. Likewise, it switches the frequency dividing ratio to N+1 upon receiving a delay control signal and returns the frequency dividing ratio to N after a predetermined period of time.

Thus, the phase of the spreading code can be shifted finely and accurately by switching the frequency dividing ratios in a controlled manner to improve the ability of regulating the timing for the output of a spreading code.

BRIEF DESCRIPTION OF THE DRAWINGS

FIG. 4 is a timing chart for the operation of the frequency devider circuit of the embodiment of FIG. 2.

DESCRIPTION OF THE PREFERRED EMBODIMENT

Figure 1:
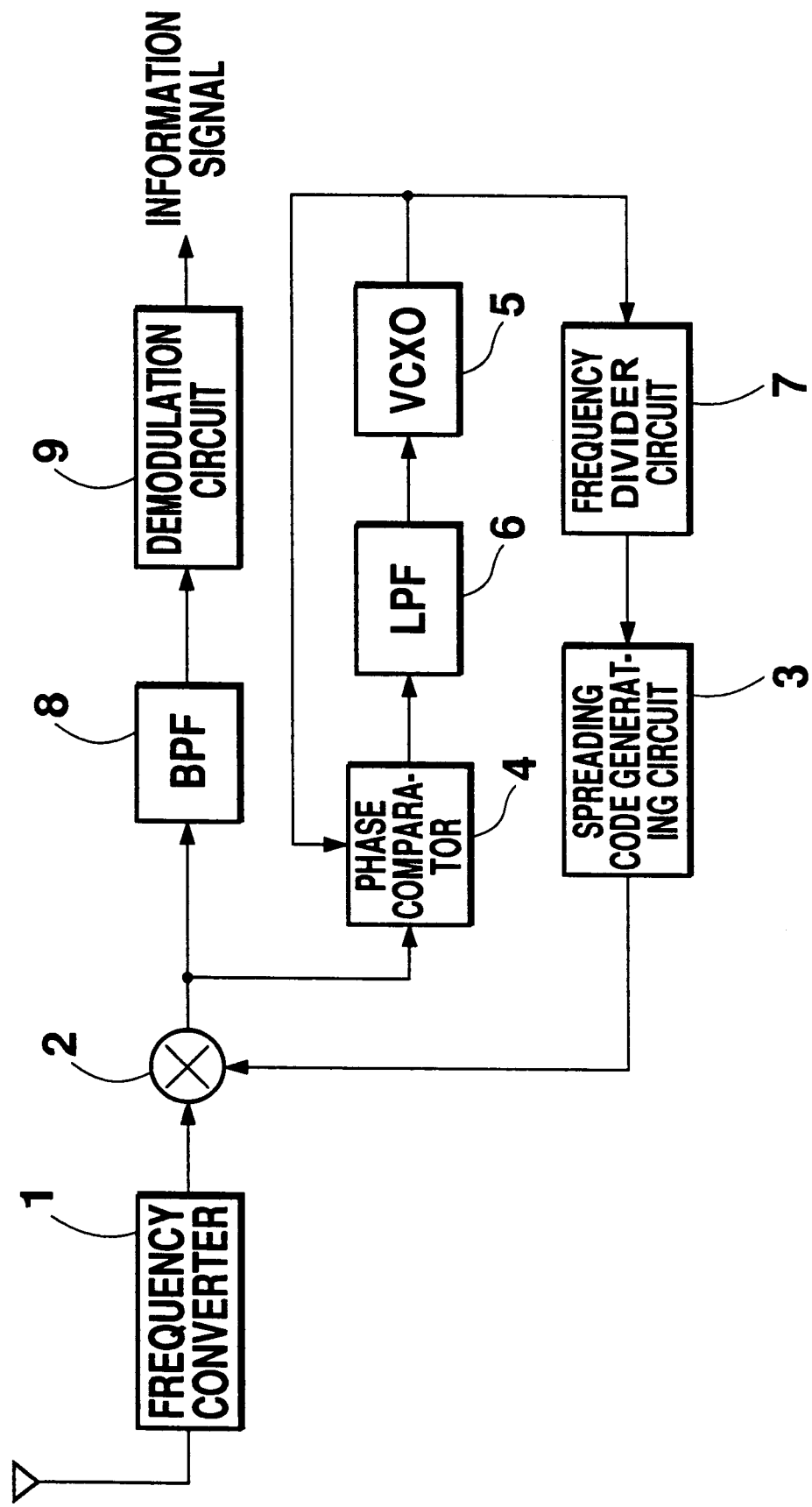
FIG. 1 is a schematic block diagram of a known spread spectrum receiver.
Figure 2:
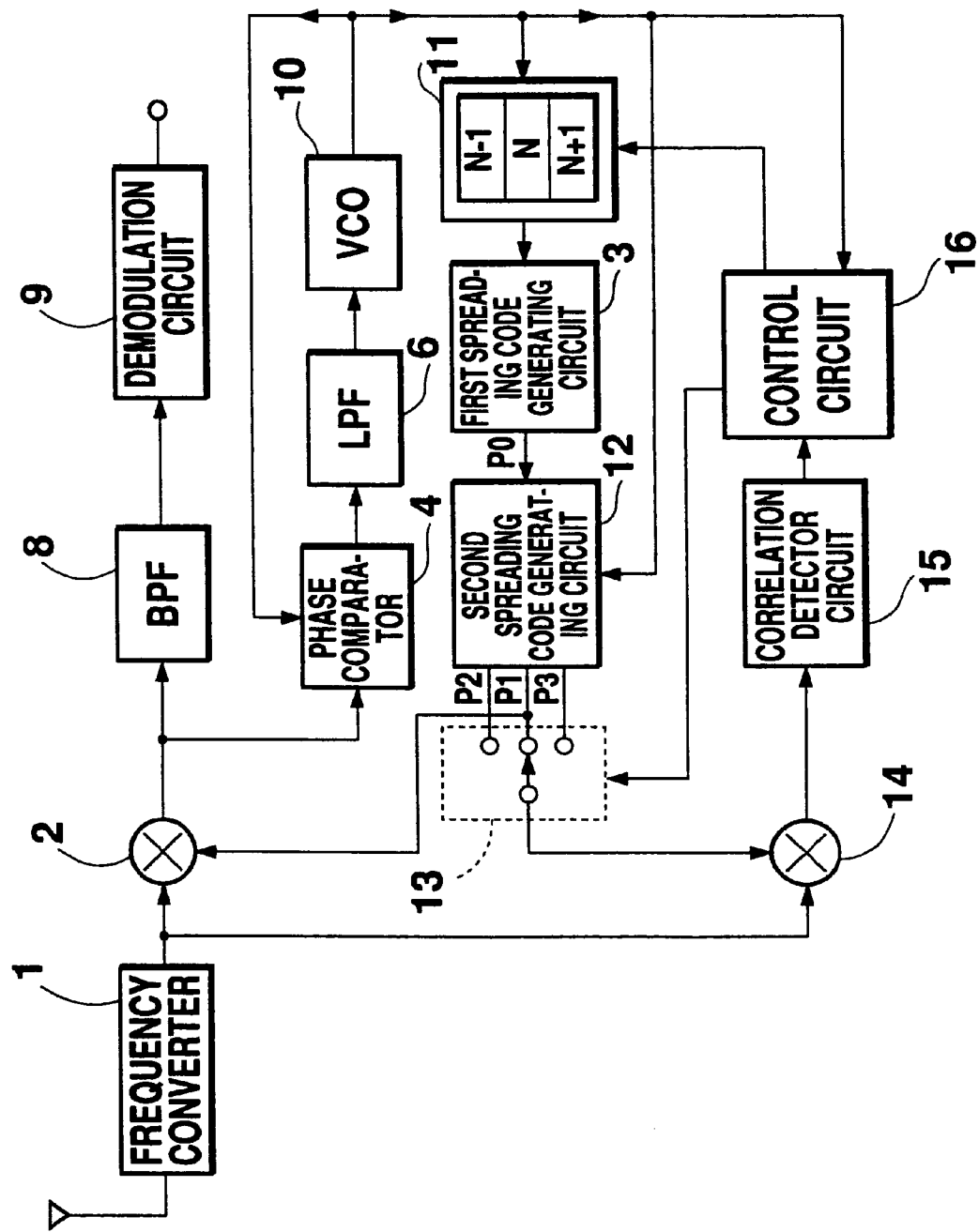
FIG. 2 is a schematic block diagram of a preferred embodiment of spread spectrum receiver according to the invention.

FIG. 2 is a block diagram of a preferred embodiment of the invention. Referring to FIG. 2, it comprises a VCO (10) with a variable oscillation frequency, a frequency devider circuit (11) having frequency deviding ratios of N−1, N and N+1 (e.g., 3, 4 and 5) that can be switched, a second spreading code generating circuit (12) for generating first to third spreading codes P1 through P3 in response to spreading code P0 from a first spread spectrum generating circuit (3), a selection circuit (13) for selecting one of the three spreading codes P1 through P3, a second multiplier (14) operating as second despreading circuit for multiplying the spread spectrum signal by the output signal of the selection circuit (13), a correlation detector circuit (15) for detecting the correlation of the spread spectrum signal and the spreading codes and a control signal (16) for controlling the frequency dividing ratio of the frequency divider circuit (14) according to the output signal of said correlation detector circuit (15). Note that circuits that are the same or similar to those of the known receiver of FIG. 1 are respectively denoted by the same reference symbols and will not be described further. The VCO (10) is used in place of the VCXO (5) of FIG. 1 because it has a variable frequency range broader than that of the VCXO (5).

Referring to FIG. 2, the received spread spectrum signal is subjected to frequency conversion for a lower frequency in a frequency conversion circuit (1) and subsequently multiplied in a multiplier (2) (first despreading circuit) by the spreading code generated by the second spreading code generating circuit (12), which will be described hereinafter.

The output signal of the first multiplier (2) is then compared with the output signal of the VCO (10) for phase comparison in a phase comparator circuit (4). The output signal of the phase comparator circuit (4) that reflects the outcome of the phase comparison is smoothed by an LPF (6) and thereafter applied to the VCO (10) as a control signal. Note that the phase comparator circuit (4), the LPF (5) and the VCO (10) form a PLL (phase-locked loop), which operates to nullify the phase difference between the two input signals of the phase comparator circuit (4).

The output signal of the VCO (10) is applied to the phase comparator circuit (4) and the frequency divider (11), then the frequency of the output signal of the VCO (10) is devided by four in a frequency divider (11). Then, the first spreading code generating circuit (3) generates spreading code P0 according to the frequency devided output signal from the frequency divider (11). Then, the second spreading code generating circuit (12) generates first spreading code P1 as a reference, second spreading code P2 having a phase advanced by a predetermined value from the first spreading code P1 and third spreading code P3 having a phase delayed by a predetermined value from the first spreading code P1 according to the spreading code.

The first spreading code generating circuit (3) is a circuit having a known configuration and typically comprising one or more shift registers and exclusive OR-gates for generating an Maximum length code in response to the output signal (clock signal) of the VCO (10). The second spreading code generating circuit (12) typically comprises shift registers serially connected in three stages and uses spreading code P0 of the first spreading code generating circuit (3) as data and the output of VCO (10) as clock signal, wherein the spreading code P0 is sequentially transmitted from the first stage shift register to the third stage shift register. It produces the output signal of the second stage shift register as first spreading code P1 so that it produces second spreading code P2 advanced from the first spreading code P1 by a clock period of the output signal of the VCO (10) from the first stage shift register and third spreading code P3 delayed from the first spreading code P1 by a clock period of the output signal of the VCO (10) from the third stage shift register.

The first spreading code signal P1 from the second spreading code generating circuit (12) is applied to the first multiplier (2). consequently, the timing of generating spreading code P0 of the first spreading code generating circuit (3) is changed depending on the change in the oscillation frequency of the VCO (10) so that the PLL operates to synchronize the phase of the output signal of the first multiplier (2) and that of the output signal of the VCO (10). Thus, the synchronism of the output signal of the first multiplier (2) and that of the VCO (10) can be maintained by the well known technique.

On the other hand, the output signal of the VCO (10) is applied to the control circuit (16) and a first control signal (select signal) is applied by the control circuit (16) to the selection circuit (13) according to the output signal of the VCO (10) so that the control circuit (13) carries out a selecting operation. The correlation between the received spread spectrum signal and the spreading code is detected by the correlation detector circuit (15). Then, the control is circuit (16) determines whether the phase of the spreading code is delayed or advanced from that of the spread spectrum signal on the basis of the correlation detected by the correlation detector circuit (15) and generates a switching control signal and an advance control signal or a delay control signal, whichever is appropriate, depending on the determination. The frequency dividing ratio of the frequency divider circuit (11) is switched according to the advance or delay control signal. Thus, when it is determined by comparison that the phase of the spreading code is delayed from that of the spread spectrum signal, the frequency dividing ratio of the frequency divider circuit (11) is switched to (N−1) (e.g., 3) by the advance control signal and, consequently, the phase of the spreading code is advanced. On the contrary, when it is determined that the phase of the spreading code is advanced from that of the spread spectrum signal, the frequency dividing ratio of the frequency divider circuit (11) is switched to (N+1) (e.g., 5) and, consequently, the phase of the spreading code is delayed. If the phase of the spreading code coincides with that of the spread spectrum signal, neither an advance signal nor a delay control signal is generated and the frequency dividing ratio of the frequency divider circuit (11) remains equal to N (e.g., 4)

Thus, as a result of the above operations, a spreading code synchronized with the spreading code contained in the spread spectrum signal is generated and the spread spectrum signal is multiplied by the spreading code in the first multiplier (2) for accurate despreading. The output signal of the first multiplier (2) is applied to the demodulator circuit (9) to reproduce the information signal by demodulation.

Figure 3:
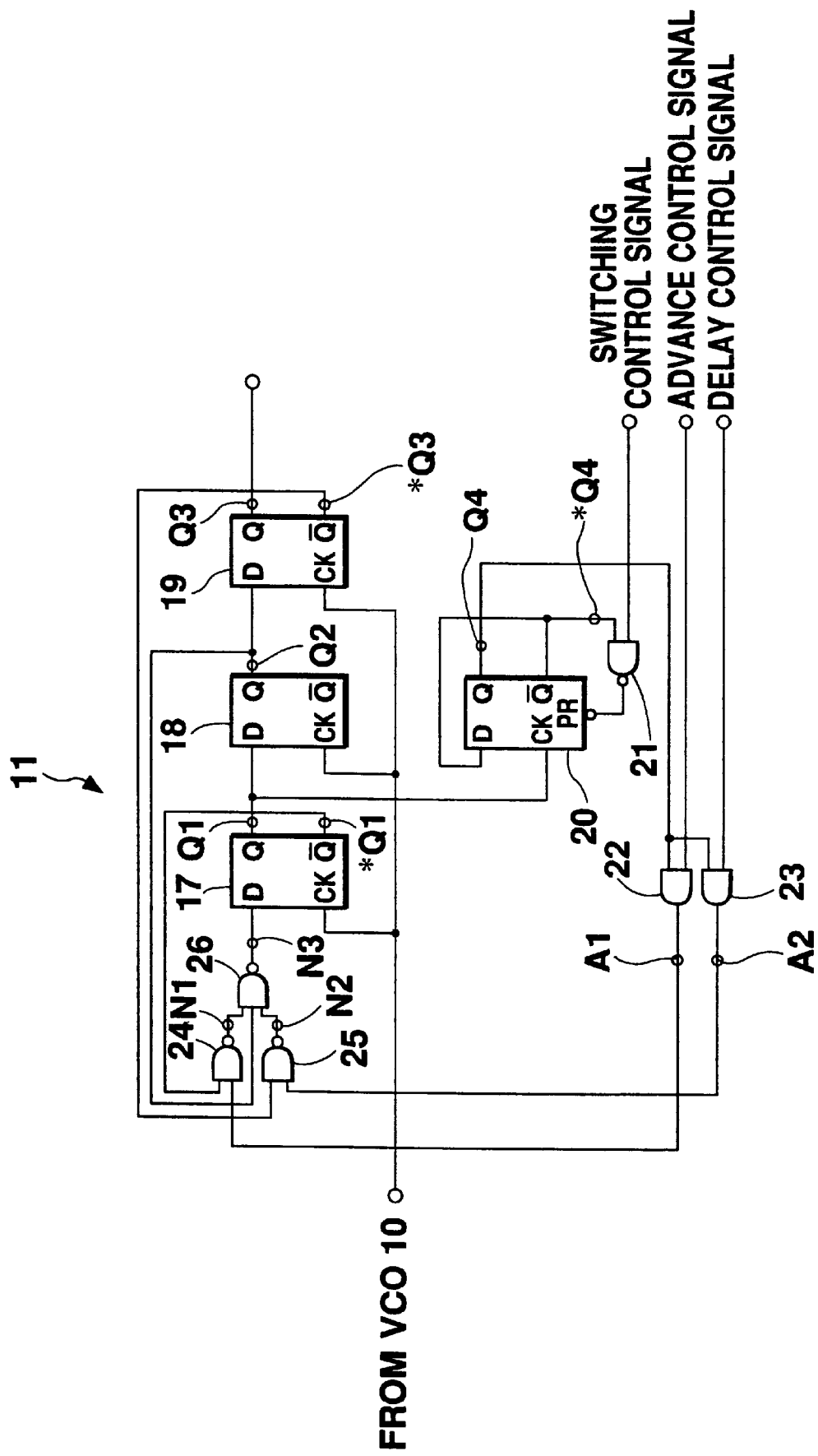
FIG. 3 is a block diagram of the frequency devider circuit 11 of the embodiment of FIG. 2.

FIG. 3 shows a circuit diagram of a specific circuit that can be used for the frequency divider circuit (11). Referring to FIG. 3, it comprises first through third D-FFs (17) through (19) to whose clock terminals CKs the output signal of the VCO (10) is applied, a fourth D-FF (20) to whose clock terminal CK a Q output signal Q1 of the first D-FF (17) is applied, a NAND-gate (21) to which the switching control signal from the control circuit (16) and a *Q output signal *Q4 of the fourth D-FF (20) are applied, an AND-gate (22) to which the control signal from the control circuit (16) and a Q output signal Q4 of the fourth D-FF (20) are applied, another AND-gate (23) to which the delay control signal from the control circuit (16) and a Q output signal Q4 of the fourth D-FF (20) are applied, a NAND-gate (24) to which a *Q output signal *Q1 of the first D-FF (17) and an output signal A1 of the AND-gate (22) are applied, another NAND-gate (25) to which a *Q output signal *Q3 of the third D-FF (19) and an output signal A2 of the AND-gate (23) are applied and still another NAND-gate (26) to which respective output signals N1 and N2 of the NAND-gates (24) and (25) and Q output signal Q2 of the second D-FF are applied.

The frequency divider circuit (11) of FIG. 3 operates in a manner as described below. Firstly, the operation when neither an advance control signal nor a delay control signal is applied will be described by referring to the timing chart of VCO (10) in (a) of FIG. 4. Since neither an advance control signal nor a delay control signal at level H are applied, the output signals of the AND-gates (22) and (23) are held to level "L", while the respective output signals N1 and N2 of the NAND-gates (24) and (25) are held to level "H". Therefore, the output signal N3 of the NAND-gate (26) is equal to a signal obtained by inverting the output signal Q2 of the second D-FF (18). consequently, as shown in FIG. 4, the first through third D-FFs (17) through (19) are reset and their respective Q output signals are held to level "L" when the first pulse of the output signal of the VCO (10) is applied so that the output signal N3 of the NAND-gate (26) is held to level "H".

The first D-FF (17) takes in the "H" level output signal of the NAND-gate (26) at the rising edge of the first pulse of the output signal of VCO (10) to cause the level of the Q output signal Q1 to rise to "H". The output signal N3 of the NAND-gate (26) is at level "H" when the second pulse of the output signal of the VCO (10) rises. Therefore, the Q output signal Q1 of the first D-FF (17) remains at level "H". The second D-FF (18) takes in the Q output signal Q1 of the first D-FF (17) to cause the level of the Q output signal Q2 to rise to "H" at the rising edge of the second pulse of the output signal of the VCO (10). Therefore, the output signal N3 of the NAND-gate (26) falls to level "L". Then, at the rising edge of the third pulse of the output signal of the VCO (10), the Q output signal Q1 of the first D-FF (17) falls to level "L" and the third D-FF (19) takes in the "H" level Q output signal Q2 of the second D-FF (18) to cause the level of the Q output signal Q3 to rise to "H". The Q output signal Q2 of the second D-FF (18) falls to level "L" at the rising edge of the fourth pulse of the output signal of the VCO (10). Therefore, the output signal of the NAND-gate (26) rises to level "H". Then, the respective Q output signals Q1 and Q3 of the first and third D-FFs (17) and (19) fall to level "L" at the rising edge of the fifth pulse of the output signal of the VCO (10). The Q output signal Q3 of the third D-FF (19) is made to be a signal obtained by dividing the frequency of the output signal of the VCO (10) by four by repeating the above operation cycle.

If an advance control signal is applied when the frequency divider circuit (11) is dividing the frequency by four, since the pulse width of the advance control signal is large relative to the period of the output signal of the VCO (10), the advance control signal remains at level "H" during the above cycle whereas all the remaining signals show respective initial states as shown in (b) of FIG. 4. Note that, however, since the output signal A2 of the AND-gate (23) is at level "L", the output signal N2 of the NAND-gate (25) is raised to level "H".

Then, a switching control pulse signal as shown in (b) of FIG. 4 is applied to reset the terminal $\overline{RR}$ of the fourth D-FF (20) via the NAND-gate (21). in this embodiment, the fourth D-FF (20) is recovered from the reset state at the rising edge of the pulse applied to the reset terminal $\overline{RR}$ and, as will be described hereinafter, generates a Q output signal Q4 only once using the Q output signal Q1 applied to the clock terminal CK as a clock. The first D-FF (17) generates an "H" level Q output signal Q1 and an "L" level *Q output signal *Q1 in response to the rising edge of the first pulse of the output signal of VCO (10). The Q output signal Q3 of the third D-FF (19) falls to level "L". The Q output signal Q4 of the fourth D-FF (20) rises to level "H" in response to the Q output signal Q1 of the first D-FF (17) and the output signal A1 of the AND-gate (22) also falls to level "H". The Q output signal Q2 of the second D-FF (18) rises to level "H" at the rising edge of the second pulse of the output signal of the VCO (10) and, therefore, the output signal N3 of the NAND-gate (26) falls to level "L". Thus, the Q output signal Q1 of the first D-FF (17) falls to level "L" and the Q output signal Q3 of the third D-FF (19) rises to level "H" at the rising edge of the third pulse of the output signal of the VCO (10). Then, the output signal N1 of the NAND-gate (24) falls to level "L" and the output signal N3 of the NAND-gate (26) rises to level "H" in response to the "H" level *Q output signal *Q1 of the first D-FF (17). Then, at the rising edge of the fourth pulse of the output signal of the VCO (10), the first D-FF (17) takes in the "H" level output signal of the NAND-gate (26) so that the Q output signal Q1 rises to level "H" while the *Q output signal *Q1 falls to level "L". The Q output signal Q4 of the fourth D-FF (20) falls to level "L" at the rising edge of the Q output signal Q1. As the output signal N1 of the NAND-gate (24) rises to level "H", the frequency divider circuit (11) restores the operation of dividing the frequency by four. Thus, as seen from FIG. 4, the frequency divider circuit (11) operates for dividing the frequency by three when an advance control signal and a switching control signal is applied thereto so that frequency divider circuit (11) outputs an advanced output signal.

When the frequency divider circuit (11) is dividing the frequency by four, the embodiment operates in a manner as described below if a delay control signal is applied as shown in (c) of FIG. 4. Since the pulse width of the delay control signal is large relative to the period of the output signal of the VCO (10) as in the case of an advance control signal, the delay control signal remains at level "H" during the above cycle whereas all the remaining signals show respective initial states as shown in (c) of FIG. 4. Note that, however, since the output signal A1 of the AND-gate (22) is at level "L", the output signal N1 of the NAND-gate (24) is raised to level "H".

Then, a switching control pulse signal as shown in (c) of FIG. 4 is applied to reset terminal $\overline{RR}$ of the fourth D-FF (20) via the NAND-gate (21) and, as in the case of advance control signal, the fourth D-FF (20) is recovered from the reset state. The first D-FF (17) generates an "H" level Q output signal Q1 and an "L" level *Q output signal *Q1 in response to the rising edge of the first pulse of the output signal of VCO (10). The Q output signal Q3 of the third D-FF (19) falls to level "L". The Q output signal Q4 of the fourth D-FF (20) rises to level "H" at the rising edge of the Q output signal Q1 of the first D-FF (17) and the output signal A2 of the AND-gate (23) also rises to level "H". Therefore, the output signal N2 of the NAND-gate (25) falls to level "L". The Q output signal Q2 of the second D-FF (18) rises to level "H" at the rising edge of the second pulse of the output signal of the VCO (10).

The Q output signal Q3 of the third D-FF (19) rises to level "H" at the rising edge of the third pulse of the output signal of the VCO (10). Then, the output signal N3 of the NAND-gate (26) falls to level "L". The Q output signal Q1 of the first D-FF (17) is held to level "H" by the output signal N3 of the NAND-gate (26). Then, the output signal N2 of the NAND-gate (25) rises to level "H" and the output signal N3 of the NAND-gate (26) falls to level "L" as the *Q output signal Q3 of the third D-FF (17) is made to be an "L" level output signal.

Then, at the rising edge of the fourth pulse of the output signal of the VCO (10), the first D-FF (17) takes in the "H" level output signal of the NAND-gate (26) so that the Q output signal Q1 falls to level "L".

The Q output signal Q2 of the second D-FF (18) falls to level "L" at the rising edge of the fifth pulse of the output signal of the VCO (10). Therefore, the output signal N3 of the NAND-gate (26) rises to level "H". The first NAND-gate (17) takes in the "H" level output signal of the NAND-gate (26) and the Q output signal Q1 rises to level "H" at the rising edge of the sixth pulse of the output signal of the VCO (10). The Q output signal Q3 of the third D-FF (19) falls to level "L" while the *Q output signal *Q3 rises to level "H". The Q output signal Q4 of the fourth D-FF (20) falls to level "L" at the rising edge of said Q output signal Q1. Thus, since the output signal A2 of the AND-gate (23) falls to level "L" and the output signal N2 of the NAND-gate (25) is held to level "H", the frequency divider circuit (11) restores the operation of dividing the frequency by four. Note that the output signal N2 of the NAND-gate (25) falls to level "L" in response to the *Q output signal *Q3 of the third D-FF (19) and thereafter returns to level "H" in response to the output signal A2 of the AND-gate (23) due to the delay effects of the related circuits. Thus, as seen from FIG. 4(c), the frequency divider circuit (11) operates for dividing the frequency by five when a delay control signal and a switching control signal is applied thereto so that frequency divider circuit (11) outputs a delayed output signal.

While the frequency divider circuit (11) is adapted to change the frequency dividing ratio in the above embodiment, it may be replaced by a plurality of frequency dividers having different frequency dividing ratios and a selection circuit for selecting one of the output signals of the frequency dividers according to the control signal from the control circuit (16).

What is claimed is:

1. A spread spectrum receiver for receiving a spread spectrum signal comprising:

a despreading circuit for despreading the spread spectrum signal; and, a phase synchronization circuit for generating an output signal with a phase synchronized with that of the output signal of said despreading circuit wherein said receiver further comprises:

a frequency divider circuit having a reference frequency dividing ratio and frequency dividing ratios smaller and greater than the reference ratio, respectively, for dividing the frequency of the output signal of said phase synchronization circuit by using one of the frequency dividing ratios;

a spreading code generating circuit for generating a plurality of spreading codes according to the output signal of said frequency divider circuit;

a correlation detector circuit for detecting the correlation of said spread spectrum code and said plurality of spreading codes; and a control circuit for generating a control signal for selecting one of the frequency dividing ratios according to the output signal of said correlation detector circuit and a select signal for switching the output signal of said spreading code generating circuit.

2. A spread spectrum signal receiver according to claim 1, wherein:

said control circuit outputs either an advance control signal or a delay control signal according to the output signal of said correlation detector circuit; and, said frequency divider circuit switches said frequency dividing ration to said smaller frequency dividing ratio upon receiving said advance control signal and to said greater frequency dividing ratio upon receiving said delay control signal.

3. A spread spectrum signal receiver for receiving a spread spectrum signal comprising: a despreading circuit for despreading the spread spectrum signal; and a phase synchronization circuit for generating an output signal with a phase synchronized with that of the output signal of said despreading circuit wherein said receiver further comprises:

a frequency divider circuit having frequency dividing ratios of N−1, N and N+1 for dividing the frequency of the output signal of said phase synchronization circuit by using one of the frequency dividing ratios;

a spreading code generating circuit for generating a plurality of spreading codes according to the output signal of said frequency divider circuit;

a correlation detector circuit for detecting the correlation of said spread spectrum code and said plurality of spreading codes; and a control circuit for generating a control signal for selecting one of the frequency dividing ratios according to the output signal of said correlation detector circuit and a select signal for switching the output signal of said spreading code generating circuit.

4. A spread spectrum signal receiver according to claim 3, characterized in that:

said control circuit outputs either an advance control signal or a delay control signal according to the output signal of said correlation detector circuit; and said frequency divider circuit switches said frequency dividing ratio to N−1 upon receiving said advance control signal and to N+1 upon receiving said delay control signal.

5. A spread spectrum signal receiver according to claim 4, characterized in that:

said frequency divider circuit switches said frequency dividing ratio to N−1 upon receiving said advance control signal and returns to said frequency dividing ratio of N after one frequency dividing period; and said frequency divider circuit switches said frequency dividing ratio to N+1 upon receiving said delay control signal and returns to said frequency dividing ratio of N after one frequency dividing period.

6. A spread spectrum signal receiver according to claim 2, characterized in that:

said control circuit generates said advance control signal when said phase of said spreading code of said spreading code generating circuit is delayed from that of said spread spectrum signal, and said delay control signal when said phase of said spreading code of said spreading code generating circuit is advanced from that of said spread spectrum signal.

7. A spread spectrum signal receiver according to claim 3, characterized in that:

said control circuit generates said advance control signal when said phase of said spreading code of said spreading code generating circuit is delayed from that of said spread spectrum signal, and said delay control signal when said phase of said spreading code of said spreading code generating circuit is advanced from that of said spread spectrum signal.

8. A spread spectrum signal receiver according to claim 1, wherein:

said spreading code generating circuit generates a first spreading code and at least either a second spreading code having a phase advanced from that of said first spreading code or a third spreading code having a phase delayed from that of the first spreading code according to the output signal of said frequency divider circuit.

9. A spread spectrum signal receiver according to claim 3, characterized in that:

said spreading code generating circuit generates a first spreading code and at least either a second spreading code having a phase advanced from that of said first spreading code or a third spreading code having a phase delayed from that of said first spreading code according to the output signal of said frequency divider circuit.

* * * * *